April 18, 1967  H. BAUER  3,314,366
COMPRESSORS OR PUMPS WITH HYDRAULIC TRANSMISSION
Filed Dec. 20, 1965

INVENTOR.
Helmut Bauer
BY
Wenderoth, Lind & Ponack
ATTORNEYS

United States Patent Office 3,314,366
Patented Apr. 18, 1967

3,314,366
COMPRESSORS OR PUMPS WITH HYDRAULIC TRANSMISSION
Helmut Bauer, Basel, Switzerland, assignor to Maschinenfabrik Burckhardt A.G., Basel, Switzerland, a Swiss company
Filed Dec. 20, 1965, Ser. No. 515,091
Claims priority, application Switzerland, Dec. 22, 1964, 16,494/64
7 Claims. (Cl. 103—44)

In compressors or pumps for extremely high pressures it has been found desirable to include a hydraulic transmission between a driving crank and the high pressure cylinder of the compressor or pump.

With pressures which exceed for example 2000 atmospheres it is necessary to arrange for the compressor or pump piston to work with a very short stroke so that the piston and its rod can be short and not exposed to the risk of buckling. For the same reasons it is desirable to construct this piston of large diameter. Very high piston forces therefore arise and direct crank drive in such machines would lead to abnormal, compact and extremely heavy construction.

By the inclusion of a hydraulic transmission this disadvantage can be obviated. Although the high pressure piston has to work with a very short stroke and very high piston forces, the drive can be derived from a relatively long stroke crank mechanism, the forces of which are within the usual values because the hydraulic transmission can provide a change in ratio between the movements of the driving and the driven pistons.

These advantages are known and have led to hydraulic transmissions often being included in such machines.

An object of the invention is the provision of a particular arrangement of such hydraulic transmission by which the advantages of small space requirement and excellent accessibility are obtained.

The present invention relates therefore to a machine comprising a compressor or pump and driving gear which includes hydraulic transmission provided by a hydraulic liquid displaced by the piston of a double-acting crank-driven primary cylinder and acting upon the piston of a double-acting secondary cylinder, horizontally disposed approximately in the centre of the machine, the secondary piston actuating the actual compressor or pump. According to the invention, in such a machine, the crank is disposed beyond one end of the primary cylinder and the primary piston is driven from the crank by at least one connecting rod connected to the piston rod of the primary piston at a point beyond the other end of the primary cylinder, the primary cylinder also being approximately centrally disposed in the machine.

The invention will be further described with reference to the accompanying diagrammatic drawings.

Figure 1:
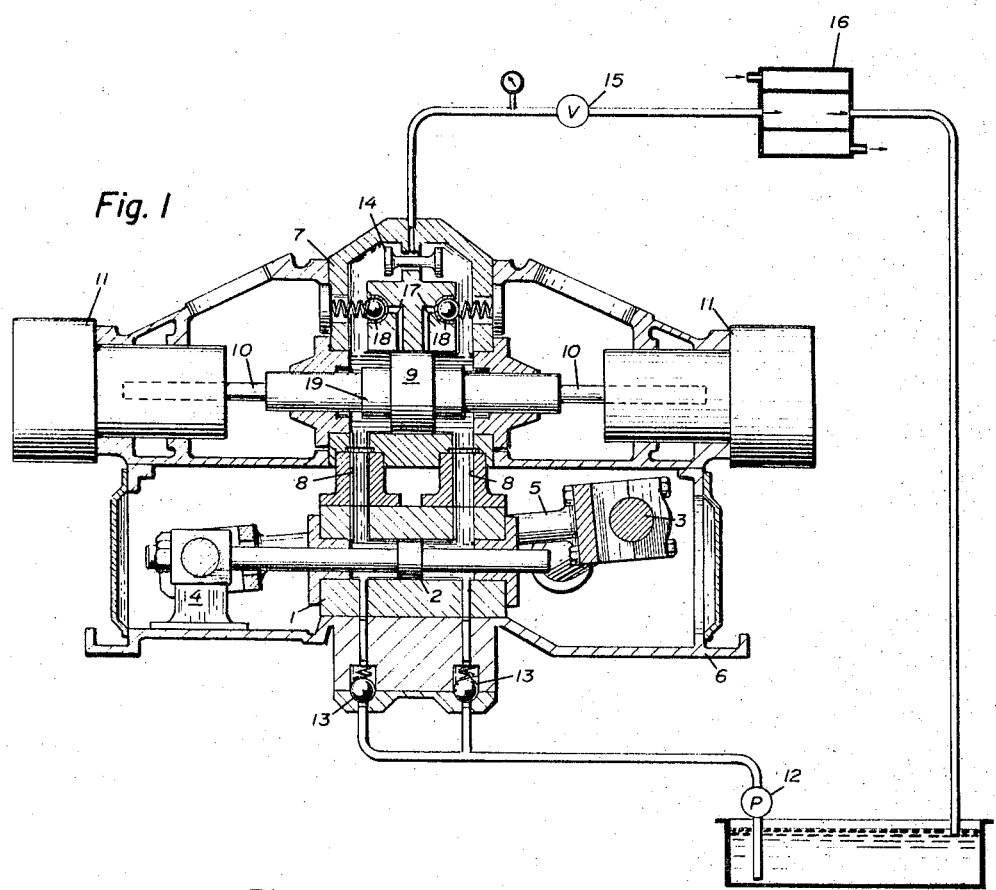
FIGURE 1 is a sectional elevation of the complete machine.
Figure 2:
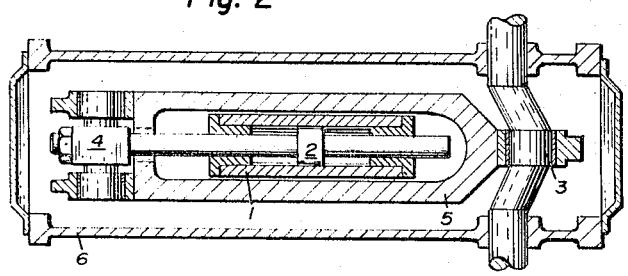
FIGURE 2 is a sectional plan of part of the machine.

In FIGURES 1 and 2 the primary oil cylinder is marked 1 and a primary piston 2 is reciprocated in it with a relatively long stroke from a crank 3. This crank is disposed beyond one end of the cylinder 1, while the cross-head 4 is arranged beyond the opposite end of the cylinder 1. The cross-head is fixed to the rod of the piston 2 and to it is connected a long forked connecting rod 5 having its big end journalled on the crank 3. As can be seen from FIGURE 2 the limbs of the forked rod 5 lie on opposite sides of the cylinder 1.

In a secondary cylinder 7 reciprocates a piston 9, opposite ends of which actuate high pressure pistons or plungers 10. As the piston 9 has a larger effective surface than the piston 2, the hydraulic transmission involves a change in movement in the lengths of stroke of the respective pistons. The stroke of the piston 9 is reduced and correspondingly greater forces can be exerted by it.

As the secondary cylinder 7 as well as the primary cylinder 1 lies exactly in the centre of the machine there is far reaching symmetry of the structure. The high pressure cylinders 11 of the compressor or pump in which the pistons or plungers 10 work lie on opposite sides of the machine and are very accessible.

In order to charge the hydraulic system with oil before the machine is started and to displace any air therein, and in order to carry away the heat due to unavoidable energy losses, a feed pump 12 is provided which pumps oil constantly into the machine through non-return valves 13 at the lowest point of the machine. The oil escapes through a double-ended non-return valve 14 arranged at the top of the machine and thence it returns to the reservoir. It is advantageous to maintain this oil constantly under a pressure above atmospheric, which is effected by a relief valve 15 in the return line. Further, the oil is cooled after leaving the machine by a cooler 16 and the heat from the energy losses is thus constantly carried away.

When the machine is stationary, the valve 14 is in mid position, that is an out-flow can take-place from both ends of the cylinder 7, but during operation a through flow of oil is only possible from the side of the cylinder 7 which is not under load. On the loaded side of the cylinder during operation the oil pressure closes the valve 13 and pushes over and closes the valve 14 on this side while leaving the passage on the other side open. The oil pump 12 therefore never has to work against the oil pressure which arises in operation but only against the low feed pressure set by the valve 15 so that the power loss due to the constant outflow of a small quantity of oil remains low. The secondary piston 9 is compelled by the above rescribed arrangements always to make a stroke which is less than the stroke of the primary piston 2 in the inverse ratio of the effective areas of the pistons. But the arrangements so far described do not ensure that the stroke lies in the correct position longitudinally in relation to the cylinder 7, that is when the mid point of the stroke is at the centre of the length of the cylinder 7. Displacement of the position of the stroke could arise for example if for any reason a larger volume of oil were enclosed in one side of the cylinder than in the other.

This risk is eliminated by further provision.

If the secondary piston 9 has moved further than it should at one end of the stroke, the corresponding one of two ports 17 will be uncovered, through which excess oil can flow through a non-return valve 18 to the unloaded side of the piston. The piston will therefore come to rest, while at the beginning of the next stroke, flow back of the oil from the now loaded side through the still open port 17 will be prevented by the non-return valve 18.

In order to prevent the piston from moving further by inertia after one of the ports has been uncovered, the piston can be provided with braking surfaces in a manner in itself known. When the piston moves beyond the correct end of the stroke enlargement 19 on which the braking surfaces are formed enters with small clearance into a recess in the cylinder head so that the oil in the recess has to escape through a narrow gap, thereby effectively braking the piston.

In the operation of such a machine, some heating-up of the circulating oil is inevitable and indeed up to a certain point is desirable, because at an elevated temperature the viscosity of the oil falls so that the energy losses are smaller. This heating results further in expansion of both the primary and the secondary cylinders. In order to prevent the heat expansions from undesirably affecting the accuracy of the moving parts of the machine, the primary cylinder 1 is not fixedly secured to the secondary cylinder 7. Connecting pipes 8 between two cylinders are longitudinally slidably engaged in the cylinder 7. The sealing of these pipes against the operating pressure can be effected by usual known means, for example by O-rings or stuffing boxes: by this construction not only is it ensured that the accuracy of guiding of the moving parts of the machine remains the same independently of heat expansion, but an improvement in accessibility is also obtained. It is now possible to lift the secondary cylinder 7 and the whole of the upper part of the machine from the base plate 6 without its being necessary to disconnect any connecting pipes. In this way, the accessibility to the driving gear is considerably improved.

Figure 3:
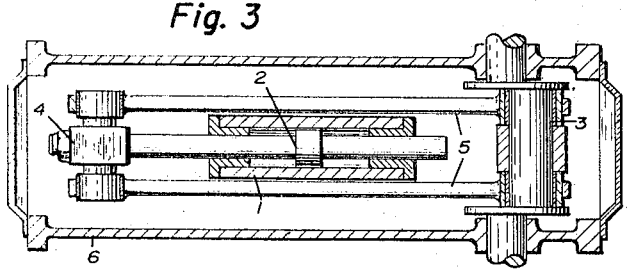
FIGURE 3 is a similar view to FIGURE 2 of a modification.

Instead of the forked connecting rod shown in FIGURE 2, separate connecting rods side by side can be used as shown in FIGURE 3 in which various parts have the same references as in FIGURE 2.

In both cases a series of advantages are obtained by this arrangement. The great length of the connecting rod 5 in relation to the crank radius, keeps the lateral pressure on the cross-head 4 very low. Further, it has been made possible to arrange the primary cylinder 1 in the centre of the machine. It is thus located beneath the secondary cylinder 7, but the connecting pipes 8 between the primary and secondary cylinders are extremely short and the oscillating oil volume is a minimum, so that the losses through hydraulic friction are very low.

The embodiments shown in the drawings are only examples for illustration of the invention. Numerous variations are possible within the ability of those skilled in the art without departing from the invention as defined by the claims.

I claim:

1. A machine comprising a compressor or pump and driving gear therefor incorporating a hydraulic transmission, said driving gear including a double acting primary cylinder disposed approximately centrally in the machine, a primary piston working in the primary cylinder, a driving crank disposed beyond one end of the primary cylinder, a primary piston rod on said primary piston projecting from the other end of the primary cylinder, at least one connecting rod connecting the crank to the primary piston rod beyond the other end of the primary cylinder, a horizontal secondary cylinder disposed approximately centrally in the machine, and hydraulic liquid displaced by the primary piston and acting on the secondary piston, said secondary piston actuating the compressor or pump.

2. A machine as set forth in claim 1 in which the primary piston is driven through a forked connecting rod, the limbs of which lie on opposite sides of the primary cylinder.

3. A machine as set forth in claim 1 in which the primary piston is driven through two separate connecting rods arranged on opposite sides of the primary cylinder.

4. A machine as set forth in claim 1 further including a continuously operated auxiliary pump for hydraulic liquid, non-return valves through which the auxiliary pump is continuously connected to both sides of the primary cylinder, a common discharge duct, outlets leading from both sides of the secondary cylinder to the common discharge duct, a pressure actuated, double ended non-return valve which under working pressure closes the outlet in which the working pressure is acting and opens the other outlet to the discharge duct, and a relief valve in the discharge duct for maintaining a predetermined pressure in the hydraulic liquid being discharged.

5. A machine as set forth in claim 1 including longitudinally movable connections between the primary and secondary cylinder for the hydraulic liquid.

6. A machine as set forth in claim 1 in which release ports are provided in the wall of the secondary cylinder located to be uncovered by the secondary piston at the respective ends of its stroke, the machine also including non-return valves with which said ports communicate, each said non-return valve when open directing the flow to the other side of the secondary cylinder.

7. A machine as set forth in claim 6 also including an enlargement on each side of the secondary piston, each such enlargement entering with small clearance into a recess in the corresponding head of the secondary cylinder if the stroke of the secondary piston exceeds a predetermined value.

References Cited by the Examiner

UNITED STATES PATENTS

| | | | |
|---|---|---|---|
| 251,593 | 12/1881 | Jamieson | 103—51 X |
| 2,585,389 | 2/1952 | Kehrl | 60—54.5 |
| 2,708,412 | 5/1955 | Mueller | 103—51 |

ROBERT M. WALKER, *Primary Examiner.*